No. 762,032. Patented June 7, 1904.

UNITED STATES PATENT OFFICE.

FERDINAND EVERS, OF DÜSSELDORF, GERMANY.

PROCESS OF EXTRACTING JUICE FROM DRIED LICORICE-ROOT.

SPECIFICATION forming part of Letters Patent No. 762,032, dated June 7, 1904.

Application filed January 30, 1904. Serial No. 191,352. (No specimens.)

*To all whom it may concern:*

Be it known that I, FERDINAND EVERS, a citizen of Germany, residing at Düsseldorf, Germany, have invented new and useful Improvements in Processes of Extracting Juice from Dried Licorice-Root, of which the following is a specification.

The present invention has for its object to obtain from dry licorice-root a juice which is perfectly equivalent to the juice produced from fresh roots and imported from Italy, France, Southern Russia, Asia Minor, and other countries of origin.

The invention chiefly consists in treating the root or an aqueous extract of the same with manganese or iron or with a mixture of both in the shape of the finely-divided metal or of the oxid or oxid hydrate or any innocuous salts or organic compounds of these metals, while adding a suitable quantity of alkali or earthy alkali or of their carbonates or other alkaline innocuous salts. Organic compounds of manganese or iron which may be used in the above-described manner are, for example, acetates, formiates, albuminates, or saccharates of manganese and iron. For the purpose of this invention manganese and its compounds are equivalents of iron and its compounds. If metallic manganese or iron or an oxid or oxid hydrate of these metals is used, the alkali is preferably added only after the manganese, iron, &c., has had considerable time to act on the root or its extract; but if metallic salts or organic compounds of the metals be employed the addition of alkali may take place at an earlier stage.

The following example will show the details of procedure. One hundred kilograms of coarsely-ground licorice-root are boiled with about three hundred liters of water and pressed. The liquid running from the press is mixed with about 0.25 kilogram of oxid of iron and boiled down to about one hundred kilograms. Subsequently a sufficient quantity of carbonate of soda is added to dissolve the iron, for which one kilogram of anhydrous sodium carbonate is generally sufficient. It may be stated that the oxid of iron is generally not soluble by the carbonate of soda. Licorice-root, however, contains organic acids, sugar, and other extractive substances which render the iron soluble by the carbonate of soda. Afterward the aqueous extract is heated for some time and boiled down to any desired weight, with or without previous filtration. As mentioned above, the sodium carbonate may be added to the root at the time of extraction with water, or it may be added to the juice pressed out of the root.

The process is based on the following observations: Finely-divided iron, manganese, and their oxids combine easily with free vegetable acids by forming more or less insoluble products. As soon as a slight excess of alkali is added these metallic compounds enter into solution. If now the aqueous extract is neutralized with alkali and then a solution of iron or manganese is added, a metallic compound of the organic acid contained in the extract is precipitated, which enters again into solution on the addition of a slight excess of alkali. This is the case, for instance, with the glycyrrhizin of the licorice-root. In the alkaline solution both the metals have an oxidizing action on the organic constituents of the extract, which is accompanied by a complete change in the taste and odor of the extract and, owing to its contents of tannin, also in appearance of the same. Alkali is sometimes added also to the aqueous extract of fresh licorice-root, but only because owing to the prolonged grinding of the fresh licorice-root the pulp thus obtained from the root tends to become too strongly acid, which must be prevented. The juice of the fresh licorice-root is only slightly acid. The fresh root contains considerable quantities of solid compounds of iron, sometimes also compounds of manganese, which are incorporated in a soluble form with the licorice-juice, and thereby cause the distinctive properties of the licorice-juice, such as is imported from countries of its origin. By drying the licorice-roots these metallic compounds are rendered insoluble, after which they cannot be sufficiently dissolved even by alkali. Consequently in using dry root it is necessary to add the metal artificially, which must be present in considerable quantity. From this follows the necessity of adding a larger quantity of alkali to render the iron and manganese soluble and to produce the dark color of the juice.

Having now particularly described and ascertained the nature of my said invention and in what manner the same is to be performed, I declare that what I claim is—

1. The process for obtaining licorice-juice from completely or partly dried licorice-root, which consists in treating an aqueous extract of the root with iron and with an alkali, substantially as described.

2. The process for obtaining licorice-juice from completely or partly dried licorice-root, which consists in boiling the root in a finely-divided condition with water, separating the aqueous extract thus produced from the solid residue; adding to the extract oxid of iron, concentrating it by evaporation, adding sodium carbonate to dissolve the iron, finally heating and concentrating the extract, substantially as described.

Signed by me at Dusseldorf, Germany, this 16th day of January, 1904.

FERDINAND EVERS.

Witnesses:
WM. ESSENWEIN,
PETER LIEBER.